United States Patent
Atkins

(10) Patent No.: US 6,187,385 B1
(45) Date of Patent: Feb. 13, 2001

(54) NON-POLYMERIC ACETOACETATES AS ADHESION PROMOTING COALESCING AGENTS

(75) Inventor: Douglas Grant Atkins, Kingsport, TN (US)

(73) Assignee: Eastman Chemical Company, Kingsport, TN (US)

(*) Notice: Under 35 U.S.C. 154(b), the term of this patent shall be extended for 0 days.

(21) Appl. No.: 09/295,044

(22) Filed: Apr. 20, 1999

Related U.S. Application Data

(62) Division of application No. 08/944,651, filed on Oct. 6, 1997, now Pat. No. 5,922,790.
(60) Provisional application No. 60/034,985, filed on Jan. 9, 1997.

(51) Int. Cl.$^7$ ........................................................ B05D 7/14
(52) U.S. Cl. ............................................................. 427/388.4
(58) Field of Search ........................................... 427/388.4

(56) References Cited

U.S. PATENT DOCUMENTS

| | | |
|---|---|---|
| 4,292,661 | 9/1981 | Johnson et al. . |
| 4,296,226 | 10/1981 | Braun et al. . |
| 4,421,889 | 12/1983 | Braun et al. . |
| 5,002,998 | 3/1991 | Carey et al. . |
| 5,055,511 | 10/1991 | Ingle . |
| 5,120,607 | 6/1992 | Ingle . |
| 5,349,026 | 9/1994 | Emmons . |
| 5,494,975 | 2/1996 | Lavoie . |

FOREIGN PATENT DOCUMENTS

| | | | |
|---|---|---|---|
| 1231011 | * | 12/1966 | (DE) . |
| 0 326 723 | | 8/1989 | (EP) . |
| 0 390 370 | | 10/1990 | (EP) . |
| 0 599 478 | | 6/1994 | (EP) . |
| 50-002028 | * | 1/1975 | (JP) . |
| 4-154873 | | 6/1992 | (JP) . |

OTHER PUBLICATIONS

US Patent 5,266,630, equivalent of EP 262720, Nov. 1993.
English abstract of JP 3,290,486, Dec. 1991.

* cited by examiner

Primary Examiner—Erma Cameron
(74) Attorney, Agent, or Firm—Rose M. Allen; Harry J. Gwinnell

(57) ABSTRACT

This invention provides esters of acetoacetic acid useful as adhesion promoters for waterborne coatings compositions applied to corroded or rusty metal substrates. The esters of acetoacetic acid also function as a coalescing aid in the coating composition.

7 Claims, No Drawings

NON-POLYMERIC ACETOACETATES AS ADHESION PROMOTING COALESCING AGENTS

This is a divisional application of application Ser. No. 08/944,651, filed Oct. 6, 1997, now U.S. Pat. No. 5,922,790, which claims the benefit of U.S. Provisional Application No. 60/034,985, filed Jan. 9, 1997.

BACKGROUND OF THE INVENTION

1. Field of the Invention

The present invention is directed to waterborne coating compositions containing an aqueous polymer dispersion and a non-polymeric material containing an acetoacetyl group which serves as a coalescing agent and promotes adhesion of the film formed from the coating composition to a substrate.

2. Background of the Invention

Waterborne coatings comprise particles of polymeric materials dispersed in an aqueous medium. When applied to a substrate and dried, the particles coalesce to form films which protect the substrate. Certain additives such as coalescing agents or plasticizers are frequently used to promote coalescence of the latex particles in the coating during film formation so that the resulting film has a smooth glossy appearance and completely covers and protects the substrate. Other additives are used to improve adhesion of the coating film especially on metal substrates.

U.S. Pat. Nos. 4,296,226 and 4,421,889 teach that polymers having acetoacetyl pendant groups have improved adhesion to smooth non-absorbent surfaces. Further, U.S. Pat. Nos. 5,055,511 and 5,120,607 describe the use of acetoacetylated acrylic polymers in mastic caulking compositions. Other patents, such as U.S. Pat. No. 5,002,998, EP 390,370, EP 262,720 and EP 326,723, and Japanese Kokai Hei 4 (1992)-164873 describe the use of polymers containing acetoacetoxy groups bound to the polymeric structure. U.S. Pat. No. 5,349,026 describes the use of a polymer containing an acetoacetate group in a coating or impregnating composition. The polymer functions to coalesce and crosslink an emulsion polymer. U.S. Pat. No. 5,494,975 describes preparation of polymers containing functional acetoacetate groups which are then reacted with a functional amine to form an enamine.

In all of the above references, the acetoacetoxy group is chemically bound to the polymer which forms the coating. This severely limits the chemical nature of the polymeric coating, since the polymer must either be based upon an acetoacetylated copolymerizable monomer or it must contain pendant groups, such as hydroxy or amine, which are capable of reacting with an acetoacetylating agent.

Japanese Patent 3,290,486 describes a process for promoting adhesion to a tin-lead alloy plated steel sheet which involves immersing the sheet in an aqueous acetoacetic acid ester prior to painting.

SUMMARY OF THE INVENTION

The present invention provides waterborne coating compositions comprising an aqueous polymer dispersion, an acetoacetate ester, and optional conventional additives. The waterborne composition has improved adhesion to substrates, particularly to corroded, oxidized and galvanized metal surfaces.

Another embodiment of this invention includes a method for improving the adhesion of waterborne coating compositions to various substrates, especially to rusty, corroded or galvanized metal.

DESCRIPTION OF THE PREFERRED EMBODIMENTS

Applicants have unexpectedly found that when a non-polymeric acetoacetate ester is added to waterborne coating compositions, the film resulting from the waterborne coating composition containing the acetoacetate exhibits improved adhesion to a substrate, especially corroded metal substrates. The acetoacetate ester may be added to the waterborne coating composition during formulation of the aqueous dispersion polymer or just prior to application of the formulation onto the substrate. The acetoacetate ester may be added either neat (pure) or as a solution together with other conventional paint additives, such as coalescing aids, plasticizers, etc. The resulting waterborne coating composition has the desirable properties of the latex composition, and in addition, exhibits greatly improved adhesion, especially to corroded metal and oxidized substrates.

Thus, the present invention provides waterborne coating compositions comprising: (A) an aqueous dispersion polymer, (B) an acetoacetate compound of Formula (I):

$$(R^1C(=O)CH_2COO)_xR^2 \qquad (I)$$

wherein $R^1$ is a $C_1$–$C_6$ alkyl group, $R^2$ is a $C_1$–$C_6$ alkyl group or the residue of a polyol and x is an integer of from 1 to 3; and (C) optional, conventional additives.

Component (A)—Aqueous Dispersion Polymer

Useful aqueous dispersion polymers may be selected from the group consisting of acrylic latex polymers, vinyl latex polymers and waterborne alkyds.

Preferably, the aqueous dispersion polymer of the present invention is an acrylic latex polymer or vinyl latex polymer formed by polymerization of known monoethylenically unsaturated monomers. The term "latex" is used in the conventional meaning to denote stable dispersions of resin particles in a water system. Further, the term "polymer" is used to denote a homopolymer or a copolymer.

Suitable polymerizable or copolymerizable monoethylenically unsaturated monomers for the preparation of a latex polymer include, but are not limited to, a monoethylenically unsaturated monomer which may be represented by the general Formula (II):

$$CH_2=C(R^3)COOR^4 \qquad (II)$$

where $R^3$ is hydrogen or a $C_1$–$C_3$ alkyl group, and $R^4$ is a $C_1$–$C_{20}$ alkyl group, phenyl, benzyl, hydroxy-($C_1$–$C_4$)-alkyl, alkoxy-($C_1$–$C_4$)-alkyl, cyclopentyl, cyclohexyl, $C_1$–$C_4$-alkylfuryl, tetrahydrofuryl, $C_1$–$C_4$ alkyltetrahydrofuryl and combinations of these monomers thereof. Combinations of monomers where $R^3$ is hydrogen and monomers where $R^3$ is an alkyl group are used to modify the glass transition temperature of the latex polymer.

Preferred examples of comonomers are, but are not limited to, methyl (meth)acrylate, ethyl (meth)acrylate, propyl (meth)acrylate, isopropyl (meth)acrylate, butyl (meth)acrylate, isobutyl (meth)acrylate, hexyl (meth)acrylate, isooctyl (meth)acrylate, isodecyl (meth)acrylate, lauryl (meth)acrylate, stearyl (meth)acrylate, phenoxyethyl (meth)acrylate, methoxyethyl (meth)acrylate, benzyl (meth)acrylate, ethoxyethyl (meth)acrylate, 2-ethylhexyl (meth)acrylate, cyclopentyl (meth)acrylate, and isobornyl (meth)acrylate, as well as combinations of those monomers thereof. The term "(meth)acrylate" is used to denote an acrylate or methacrylate. The term "alkyl" is used to denote straight chain or branched alkyl groups.

Additional suitable polymerizable monoethylenically unsaturated monomers include styrenic monomers. Styrenic monomers denote styrene, or substituted styrenes, such as $C_1$–$C_6$ alkyl ring-substituted styrene, $C_1$–$C_3$ alkyl-substituted styrene or a combination of ring and -alkyl substituted styrene. Preferred styrenic copolymerizable monomers include styrene, p-methyl styrene, o-methyl styrene, -methyl styrene and combinations thereof.

In addition, vinyl ester monomers may be used as polymerizable monoethylenically unsaturated monomers. Such vinyl esters include vinyl acetate, di-n-butylmaleate, and compounds of the general Formula (III):

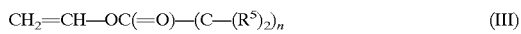

$$CH_2=CH-OC(=O)-(C-(R^5)_2)_n \qquad (III)$$

where $R_5$ is a hydrogen or a $C_1$–$C_{12}$ alkyl group and where n is an integer of 1 to 20; preferably at least one $R^5$ is methyl.

Olefin monomers, such as ethylene or propylene, and diolefin monomers, such as butadiene may also be included.

The latex polymers referred to herein are known polymers. Latex polymers can be prepared by conventional free radical emulsion polymerization processes known in the art. Conventional catalysts used in emulsion polymerization include hydrogen peroxide, potassium or ammonium peroxidisulfate, dibenzoyl peroxide, lauryl peroxide, ditertiarybutyl peroxide, 2,2'-azobisisobutyronitrile, t-butyl peroxide, t-butyl hydroperoxide, benzoyl peroxide, sodium formaldehyde sulfoxylate and the like.

Suitable surfactants for the preparation of latex polymers include anionic or nonionic surfactants, such as alkylpolyglycol ethers including ethoxylation products of lauryl, oleyl, and stearyl alcohols; alkylphenol-polyglycol ethers, such as ethoxylation products of octyl- or nonylphenol, diisopropylphenol, triisopropylphenol; alkali metal ammonium salts or alkyl, aryl or alkylaryl sulfonates, sulfates, phosphates, and the like, including sodium lauryl sulfate, sodium octylphenol, glycol ether sulfate, sodium dodecyl benzene sulfonate, sodium lauryl diglycol sulfate, ammonium tritertiary butyl phenol sulfonate and penta- and octaglycol sulfonates; sulfosuccinate salts such as disodium ethoxylated nonylphenol, half ester or sulfosuccinic acid, disodium n-octyidecyl sulfosuccinate, sodium dioctyl sulfosuccinate, and the like. The term "aryl" in the context of this application is used to denote an aromatic ring radical or a substituted aromatic ring radical, such as phenyl, naphthyl or anthracenyl radical.

In addition, reactive anionic or nonionic surfactants possessing styrene or allyl groups may be used in the preparation of latex polymers. Examples include surface active monomers such as SAM 181, 183, 184, 211, sold by PPG Industries, Inc., which are anionic sulfates or sulfonates, and SAM 185–187, also available from PPG Industries, Inc., which is a nonionic reactive surfactant. Other reactive surfactants include those sold by Daiichi Kogyo Seiyaku under the name AQUARON surfactants. Examples of AQUARON surfactants include compounds of the formulae:

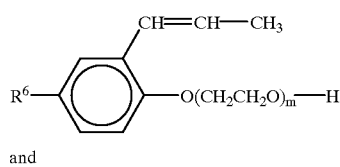

and

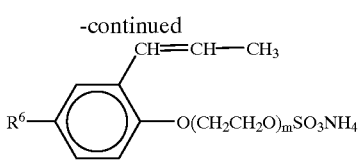

wherein $R^6$ is $C_1$–$C_{12}$ alkyl group and m is an integer of from 1–5. Additional reactive surfactants include TREM LF-40 sodium alkyl allyl sulfosuccinate, sold by Henkel. Further examples of useful surfactants can be found in U.S. Pat. Nos. 5,185,212; 2,600,831; 2,271,622; 2,271,623; 2,275,727; 2,787,604; 2,816,920; and 2,739,891, incorporated herein by reference.

Alternatively, the aqueous dispersion polymer can be a waterborne alkyd. The term "alkyd" is used to denote a synthetic resin which is the condensation product of polybasic acids, polyhydric alcohols and oil fatty acids. Such alkyds are generally prepared by polycondensation of various polybasic acids, polyhydric alcohols and fatty acids. The term "oil fatty acid" as used herein denotes, for example, tall oil fatty acid (TOFA), linseed oil, soybean oil, coconut oil, castor oil, sunflower oil, safflower oil, tung oil, oiticia oil, etc. These oils contain both saturated and unsaturated fatty acids. Depending on oil type and composition, the saturated fatty acid content varies in the range of from about 2.0 to 95.0 weight %, whereas the unsaturated fatty acid content varies from about 10.0 to about 98.0 wt. %.

The saturated fatty acid content in these oils is mainly from a mixture of stearic ($C_{18}$) and palmitic ($C_{16}$) acids, but various oils containing saturated fatty acids with $C_8$, $C_{10}$, $C_{14}$ carbon chain may also be used. The unsaturated fatty acid content in these oils is mainly from oleic acid, linoleic acid and linolenic acid.

Polyhydric alcohols used in the preparation of waterborne alkyds include glycerol, neopentyl glycol (NPG), cyclohexanedimethanol (CHDM), ethylene glycol, propylene glycol, pentaerythritol, neononyl glycol (NNG), diethylene glycol (DEG), dipropylene glycol (DPG), trimethyl pentanediol (TMPD), triethylene glycol (TEG), trimethylolpropane (TMP), dipentaerythritol (DPE), tripentaerythritol (TPE) and the like.

Polybasic acids used in the preparation of waterborne alkyds include, but are not limited to, cyclohexanedicarboxylic acid (CHDA), isophthalic acid (IPA), terephthalic acid (TPA), phthalic anhydride (PA), adipic acid (AD), oxalic acid, malonic acid, dimethylmalonic acid, succinic acid, glutaric acid, trimethyladipic acid, pimelic acid, 2,2-dimethylglutaric acid, azelaic acid, sebacic acid, fumaric acid, maleic acid, itaconic acid, 2,5-norbornane dicarboxylic acid, 1,4-naphthalic acid, diphenic acid, 4,4'-oxydibenzoic acid, diglycolic acid, thiodipropionic acid, 4,4'-oxydibenzoic acid, diglycolic acid, thiodipropionic acid, 4,4'-sulfonyldibenzoic acid, 4,4'-diphenyldicarboxylic acid, and 2,6-naphthalene dicarboxylic acid. Suitable dicarboxylic acids used in waterborne alkyds include aliphatic dicarboxylic acids, aromatic dicarboxylic acids, alicyclic dicarboxylic acids or mixtures of two or more of these acids. Examples of commercially available waterborne alkyds include AROLON resin, available from Reichhold. Further examples may be found in the treatise by C. R. Martens, in "Alkyd Resins", Reinhold Publishing Corp., New York, 1961.

In the above-described waterborne compositions, the aqueous dispersion polymer may preferably have a particle size of from about 0.01 to about 3 microns, as measured by electron microscopy. The polymer particles generally have a spherical shape. In a preferred embodiment, the spherical polymeric particle has a core portion and a shell portion or a gradient structure. Conventionally, in core/shell particles the Tg of the polymer composition of the core is different than the Tg of the polymer composition of the shell. The core/shell polymer particles may also be prepared in a multi-lobe form, a peanut shell, an acorn form, a raspberry form or any other form.

The glass transition temperature (Tg) of the aqueous dispersion polymer, in accordance with the present invention, may be up to about 100° C. In a preferred embodiment of the present invention, where film forming at ambient temperatures is desirable, the glass transition temperature may preferably be under 60° C.

It should be understood that the only limitation on the aqueous dispersion polymer is that it is one in which the polymer contains no functional groups which are reactive with component (B), an acetoacetate compound. It is preferred that the polymer component (A) does not contain a pendant functionality of an acetoacetate compound, either by copolymerization with a monomer containing this functionality or by post reaction to introduce such pendant functionalities.

Component (B)—Acetoacetate Compounds

Component (B) is an acetoacetate compound which is not chemically bound to the aqueous polymer dispersion (A). Component (B) may be represented by formula (I):

$$(R^1C(=O)CH_2COO)_xR^2 \quad (I)$$

wherein $R^1$ is a $C_1$–$C_6$ alkyl group, $R^2$ is a $C_1$–$C_6$ alkyl group or the residue of a polyol and x is an integer of from 1 to 3. Preferred acetoacetate compounds are those where $R^1$ is methyl $R^2$ is t-butyl and x is 1; $R^1$ is methyl, $R^2$ is ethyl and x is 1; and $R^2$ is ethyl, $R^2$ is butyl and x is 1.

Preferred compounds of Formula (I), include, but are not limited to, ethylene glycol bis(acetoacetate); diethylene glycol bis(acetoacetate); propylene glycol bis(acetoacetate); 2,2,4-trimethylene glycol bis(acetoacetate); cyclohexanediol bis(acetoacetate); trimethylpropane tris (acetoacetate), glycerol tris(acetoacetate) and alkyl acetoacetates such as 2-butyl-2-ethyl-1,3-propane diol bis (acetoacetate) and ethyl acetoacetate. The alkyl acetoacetates represent a preferred embodiment of the present invention. Limitations of $R^1$ and $R^2$ are chiefly those imposed by the physical characteristics such as melting point, volatility, solubility, etc., of the resulting ester. Further, either or both of $R^1$ and $R^2$ may contain other substituents, with the proviso that component (B) contains no substituents that are reactive with component (A) to which they are added and do not adversely affect the substrate to which they are applied.

Acetoacetate compounds useful in the practice of the present invention may be prepared by methods known in the art, such as those described in U.S. Pat. No. 5,051,529, incorporated herein by reference.

The amount of component (B) required to produce the desired adhesion promoting effect will depend upon a number of factors, such as the degree of corrosion of the metal substrate or other pretreatment to which the substrate has been subjected. In general, the preferred range of component (B) is from 1 to 25 parts by weight of component (B) per 100 parts (phr) of aqueous polymer dispersion component (A); a more preferred range is from 10 to 25 phr; and most preferred is from 15 to 20 phr. The upper concentration of component (B) may be limited both by economic considerations and because incremental improvement may be slight at concentrations of component (B) above about 25 phr.

Component C—Conventional Additives

Components (A) and (B) of this invention may be used in combination with other optional conventional paint additives, such as coalescing aids, dryers, surfactants, and the like.

Included among such additives are leveling, rheology, and flow control agents such as silicones, fluorocarbons or cellulosics; flatting agents; pigment wetting and dispersing agents and surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

Examples of flatting agents include SYLOID® synthetic silica, available from the Davison Chemical Division of W. R. Grace & Company; HERCOFLAT® polypropylene available from Hercules Inc; and ZEOLEX® synthetic silicate available from J. M. Huber Corporation.

Examples of dispersing agents and surfactants include sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium isodecyl sulfosuccinnate, disodium ethoxylated alcohol half ester of sulfosuccinnic acid, disodium alkyl amido polyethoxy sulfosuccinnate, tetrasodium N-(1,2-dicarboxyethyl)-N-octadecyl sulfosuccinnamate, disodium N-octasulfosuccinnamate, sulfated ethoxylated nonylphenol, 2-amino-2-methyl-l-propanol, and the like.

Examples of viscosity, dispersion, and flow control agents include polyaminoamide phosphate, high molecular weight carboxylic acid salts of polyamine amides, and alkylene amine salts of an unsaturated fatty acid, all available from BYK Chemie U.S.A. under the tradename ANTI TERRA® wetting agent. Further examples include polysiloxane copolymers, aqueous polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide. Examples of thickeners include methane ethylene oxide associative thickeners and UCAR 45 water soluble carboxylated thickeners available from Union Carbide.

Several proprietary antifoaming agents are commercially available, for example, under the tradename BRUBREAK of Buckman Laboratories Inc., under the BYK® tradename of BYK Chemie, U.S.A., under the FOAMASTER® and NOPCO® tradenames of Henkel Corp./Coating Chemicals, under the DREWPLUS® tradename of the Drew Industrial Division of Ashland Chemical Company, under the TROYSOL® and TROYKYD® tradenames of Troy Chemical Corporation, and under the SAG® tradename of Union Carbide Corporation.

Examples of fungicides, mildewcides, and biocides include 4,4-dimethyloxazolidine, 3,4,4-trimethyloxazolidine, modified barium metaborate, potassium N-hydroxy-methyl-N-methyldithiocarbamate, 2-(thiocyanomethylthio) benzothiazole, potassium dimethyl dithiocarbamate, adamantane, N-(trichloromethylthio) phthalimide, 2,4,5,6-tetrachloro-isophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazoles, hindered amines, and hindered benzoates, available from American Cyanamide Company under the tradename CYASORB UV, and diethyl-3-acetyl4-hydroxy-benzyl-phosphonate, 4-dodecyloxy-2-hydroxy benzophenone, and resorcinol monobenzoate.

Further, examples of useful conventional additives (C) can be found in "Raw Materials Index", published by the National Paint & Coatings Association, 1500 Rhode Island Avenue, N.W., Washington, D.C. 20005.

The paint or coating additives described above form a relatively minor proportion of the waterborne composition of the present invention. Additive component (C) may be present in an amount from about 0.05 wt. % to about 5.00 wt. %, based on the total weight of components (A) and (B) of the waterborne composition. However, the amount of additives is not critical and may be adjusted higher or lower to obtain desired properties.

The waterborne composition as set forth above, may further comprise one or more pigments in a concentration of about 1 to about 70 wt. %, preferably about 30 to about 60 wt. % based on the total weight of components (A) and (B) in the waterborne composition.

Pigments suitable for use in the coating compositions envisioned by the present invention are typically organic and inorganic pigments, well-known to one of ordinary skill in the art of surface coatings. Examples include, but are not limited to the following: Cl Pigment White 6 (titanium dioxide); Cl Pigment Red 101 (red iron oxide); Cl Pigment Yellow 42, Cl Pigment Blue 15, 15:1, 15:2, 15:3, 15:4 (copper phthalocyanines); Cl Pigment Red 49:1; and Cl Pigment Red 57:1.

After formulation, the waterborne composition may then be applied to a desired substrate or article, e.g., steel, aluminum, or galvanized sheeting (either primed or unprimed), and allowed to air dry. A waterborne composition in accordance with the present invention may further be designed for industrial coatings, textile coatings, ink coatings, adhesives, or coatings for plastics. While the compositions of this invention are preferentially for coatings applied to rusty or corroded metal substrates, it should be understood that the waterborne coating compounds are adhesion promoters and may also be broadly applicable to other substrates. Thus, as a further aspect of the present invention, there is provided a method for coating a shaped or formed article with the waterborne compositions of the present invention.

Although the invention is described in the Examples that follow particularly with reference to rusted or BonderizedTM steel, it should be understood that it is also applicable to cleaned and treated metal or to metal which has been subjected to other treatments, such as galvanizing or treating with other surface coatings. Use of the composition of the present invention on various iron alloys, in addition to steel, is also within the scope of the present invention.

Having generally described this invention, a further understanding can be obtained by reference to certain specific examples which are provided herein for purposes of illustration only and are not intended to be limiting unless otherwise specified.

EXAMPLES

Test Methods

Metal Pretreatment

Cold rolled steel was used as the substrate in all of the examples. Unless specified otherwise, the steel was subjected to treatment with BONDERITE™ TM 1000 iron phosphate wash. For evaluation on "rusted" steel, cold rolled steel was "rusted" by treatment in a salt fog chamber for 96 hours and washed to remove traces of salt.

Adhesion to Substrates

Adhesion was evaluated by the "Cross-Cut Tape Test" described in ASTM 3359-87, "Standard Test Methods for Measuring Adhesion by Tape Test", using a Gardner Cross Hatch Adhesion Tester. The grid was covered with pressure sensitive tape, which was smoothed by hand to ensure good contact, and then removed by a rapid pulling motion. The degree of adhesion of the coating was rated from the damage to the grid and reported in the following tables as percentage of paint squares which remained intact.

Salt Fog Test

This test was run according to ASTM Method B117-90, in which salt fog was allowed to deposit on the test paneling in a closed chamber, after which the panel was examined visually and, if desired, subjected to other tests.

Component (A)—Aqueous Dispersion Polymer

The following resins were used in the examples: NEOCRYL® acrylic-styrene resin, a registered trade mark of ICI; RHOPLEX® acrylic resin, a registered trade mark of Rohm and Haas; and. AROLON® water dispersible alkyd resin, a registered trade mark of Reichhold.

Examples 1–2

In these examples, acetoacetic esters were added to commercial acrylic emulsions in the concentrations noted in Tables 1 and 2, and the mixtures placed on a roller for 24 hours to ensure thorough mixing. An otherwise identical emulsion was prepared as a control, in which the acetoacetic acid ester was replaced by the coalescing agent, ethylene glycol mono butyl ether. The resulting emulsions were applied to steel plates prepared as noted above, and allowed to air dry and cure at room temperature for at least 24 hours before testing. The results of the Cross Cut Tape Test are shown in Tables 1 and 2, in which the results are expressed as the percentage of paint squares which remain intact after the test.

TABLE 1

Coating Retention, ASTM 3359-87
Substrate: Clean, Bonderized Steel

| | Acetoacetic Acid Ester[1] | | | | |
|---|---|---|---|---|---|
| Resin Emulsion | TMP Tris-AcAc 25 phr | BEPD bis-AcAc 25 phr | Et Acetoacetate 30 phr | tert-BU AcAc 25 phr | None[2] 30 phr |
| NEOCRYL ™ A-650 | 100 | 100 | 100 | 100 | 50 |
| RHOPLEX ™ CL-103 | 100 | 100 | 100 | 100 | 100 |
| NEOCRYL ™ A-6037 | 0 | 100 | 100 | 100 | 100 |

[1]TMP = Trimethylolpropane BEPD = 2-butyl-2-ethyl-1,3-propane diol Et = Ethyl t-BU = tert-butyl AcAc = Acetoacetate
[2]2Ethylene glycol mono butyl ether substituted for acetoacetate

TABLE 2

Coating Retention, ASTM 3359-87
Substrate: Corroded Steel

Acetoacetic Acid Ester[1]

| Resin Emulsion | TMP Tris-AcAc 25 phr | BEPD bis-AcAc 25 phr | Et Aceto-acetate 30 phr | tert-BU AcAc 25 phr | None[2] 30 phr |
|---|---|---|---|---|---|
| NEOCRYL® A-650 | 98 | 45 | 98 | 80 | 60 |
| RHOPLEX® CL-103 | 75 | 90 | 80 | 80 | 70 |
| NEOCRYL® A-6037 | 0 | 98 | 80 | 100 | 95 |

[1]TMP = Trimethylolpropane BEPD = 2-butyl-2-ethyl-1,3-propane diol Et = Ethyl t-BU = tert-butyl AcAc = Acetoacetate
[2]Ethylene glycol mono butyl ether substituted for acetoacetate

Examples 3 and 4

Unscribed panels, which had been prepared as described in Examples 1 and 2, were exposed for 24 hours in a salt fog chamber, then removed and washed in demineralized water with scrubbing from a soft brush to remove any loose scale. The panels were then washed with distilled water and dried in a 50° C. oven for 2 hours and tested using the Cross Cut Tape Test described above. The results are summarized in Tables 3 and 4.

TABLE 3

Results after 24 hours of Salt Fog
Coating Retention, ASTM 3359-87
Substrate: Clean, Bonderized Steel Acetoacetic Acid Ester[1]

| Resin Emulsion | TMP Tris-AcAc 25 phr | BEPD bis-AcAc 25 phr | Et Aceto-acetate 30 phr | tert-BU AcAc 25 phr | None[2] 30 phr |
|---|---|---|---|---|---|
| NEOCRYL® A-650 | 0 | 100 | 0 | 80 | 0 |
| RHOPLEX® CL-103 | 70 | 100 | 80 | 80 | 100 |
| NEOCRYL® A-6037 | 0 | 80 | 0 | 0 | 0 |

[1]TMP = Trimethylolpropane BEPD = 2-butyl-2-ethyl-1,3-propane diol Et = Ethyl t-BU = tert-butyl AcAc = Acetoacetate
[2]Ethylene glycol mono butyl ether substituted for acetoacetate

TABLE 4

Results after 24 hours of Salt Fog
Coating Retention, ASTM 3359-87
Substrate: Rusted Steel Acetoacetic Acid Ester[1]

| Resin Emulsion | TMP Tris-AcAc 25 phr | BEPD bis-AcAc 25 phr | Et Aceto-acetate 30 phr | tert-BU AcAc 25 phr | None[2] 30 phr |
|---|---|---|---|---|---|
| NEOCRYL® A-650 | 50 | 0 | 60 | 70 | 30 |
| RHOPLEX® CL-103 | 30 | 90 | 65 | 75 | 0 |
| NEOCRYL® A-6037 | 0 | 60 | 30 | 10 | 0 |

[1]TMP = Trimethylolpropane BEPD = 2-butyl-2-ethyl-1,3-propane diol Et = Ethyl t-BU = tert-butyl AcAc = Acetoacetate
[2]Ethylene glycol mono butyl ether substituted for acetoacetate

Example 5

A steel panel rusted by exposure to salt fog was rinsed, then dried and coated to a wet film thickness of 8 mils with a mixture of NEOCRYL® A650 resin and 15 phr of ethyl acetoacetate. A second panel (as a control) was treated in the same way, except that ethylene glycol mono butyl ether was substituted for the ethyl acetoacetate. The panels were dried for 72 hours at room temperature, and the adhesion of the coating was evaluated using the Cross-Cut Tape Test described above. The panel coated with the ethyl acetoacetate-containing mixture showed 100% retention of the coating. The control panel showed only 60% retention of the coating.

Example 6

Samples were prepared, as previously described, using NEOCRYL® A650 resin and 15 phr of trimethylolpropane trisacetoacetate, and ethyl acetoacetate, respectively. The coatings were applied to rusted steel panels, air dried for 1 minute, then baked at 50° C. for 30 minutes, then tested as before with the Cross Hatch Adhesion Tester. Both panels showed 100% retention of the coating.

Example 7
Adhesion Promotion

Steel panels were exposed continuously for 72 hours to a salt fog, then washed with a soft bottle brush under a constant stream of water, rinsed with deionized water, then acetone, and finally dried for 2 hours at 50° C.

A control coating was prepared from 152.3 g AROLON® 585-W-43 resin, 28.5 g of ethylene glycol monobutyl ether, 2.9 g of COBALT HYDROCURE™ drying agent available from OMG/Mooney Chemicals, Inc., 6.0 g of ACTIVE-8™ drier accelerator available from R. T. Vanterbilt, Inc., and 86.7 g of distilled water. This control coating was drawn to a thickness of about 2–3 mils on one of the rusted panels, then cured for 24 hours at 50° C. A second rusted panel was similarly coated with a mixture of 10 g of the control coating and 1 g of added ethyl acetoacetate and cured in the same way. The adhesion of the coatings was evaluated as previously described. The control panel exhibited 10% retention of the control coating; while the panel which had been treated with the ethyl acetoacetate-containing coating exhibited 80–85% coating retention.

Example 8

The procedure of Example 7 was followed using the same coating materials, except the rusted steel panels were sand blasted to a "gray metal" finish before coating. The control sample showed only 40% retention, while the ethyl acetoacetate-containing sample exhibited 95% retention.

Example 9

This example shows how the addition of ethyl acetoacetate to ARYLON® 585-W43 resin improves adhesion after salt spray exposure. Two identical formulations are prepared as follows:

| | |
|---|---|
| ARYLON ® 585W43 resin | 152.3 O g |
| Ti-PURE R-900 titanium dioxide (DuPont) | 67.70 g |
| DYSPERBYK dispersant (BYK-CHEMIE) | 6.80 g |
| Ethyleneglycol monobutyl ether | 28.50 |
| COBALT Hydrocure ™ dryer | 2.90 g |
| ACTIVE 8 ™ detergent | 6.00 g |
| Water | 86.70 g |

The above ingredients were mixed using a Cowles disperser at high speed for a Hegeman grind gauge reading of +7.

One of the above formulations (control) was drawn down onto each of the two rusty steel panels. Ethyl acetoacetate (88.3 g) was blended into the second formulation before it was also drawn down onto two rusty steel plates. The plates were allowed to cure for one week at room temperature (22° C.). Cross hatch adhesion test on one of each pair of the plates at this point showed no difference between the control and the ethyl acetoacetate-containing coating. The remaining pair of plates was then exposed to salt spray for five days. The ethyl acetoacetate-containing coating showed much improved adhesion in a repeat of the cross hatch adhesion test.

Example 10
Comparative Example

Three rusted steel panels were brushed to remove loose rust. One panel was coated with ethyl acetoacetate, allowed to drain and then, while still wet, an 8 mil wet film of RHOPLEX® AC490 resin was applied. The coating did not flow or level well, and the adhesion of the coating after baking at 50° C. for 30 minutes was less than 20%.

A second panel was treated with ethyl acetoacetate and dried in an oven for 30 min at 50° C., then coated as before with a film of RHOPLEX® AC490 resin. The film was cured at 50° C. for 30 minutes as above. Cross hatch adhesion was less than 20% retention of coating.

The third panel, which was not treated with ethyl acetoacetate, was coated with of RHOPLEX® AC490 resin and cured as above. The cross hatch adhesion test showed 80% retention of the coating. This indicates that pretreatment of a substrate with ethyl acetoacetate prior to coating actually interferes with proper adhesion of a latex coating applied to the substrate.

What is claimed is:

1. A method for coating a substrate, comprising forming a waterborne coating composition comprising:

(A) a waterborne alkyd dispersion polymer, (B) a compound of Formula (I):

$$(R^1C(=O)CH_2COO)_xR^2,$$

wherein $R^1$ is a $C_1$–$C_6$ alkyl group, $R^2$ is a $C_1$–$C_6$ alkyl group or the residue of a polyol and x is an integer of from 1 to 3, with the proviso that (B) contains no substitutes that are reactive with (A); and applying said waterborne coating composition to a substrate.

2. The method of claim 1, wherein $R^1$ is methyl, $R^2$ is t-butyl and x is 1.

3. The method of claim 1, wherein $R^1$ is methyl, $R^2$ is ethyl and x is 1.

4. The method of claim 1, wherein $R^1$ is ethyl, $R^2$ is butyl and x is 1.

5. The method of claim 1, wherein the compound of Formula (I) is selected from the group consisting of ethylene glycol bis(acetoacetate); diethylene glycol bis(acetoacetate); propylene glycol bis(acetoacetate); 2,2,4-trimethylene glycol bis(acetoacetate); cyclohexanediol bis(acetoacetate); trimethylpropane tris(acetoacetate), glycerol tris (acetoacetate), 2-butyl-2-ethyl-1,3-propane diol bis (acetoacetate) and ethyl acetoacetate.

6. The method of claim 1, wherein (B) is present in an amount of from 1 to 25 parts by weight of (B) per 100 parts of (A).

7. The method of claim 1, wherein the substrate is selected from the group consisting steel, aluminum, galvanized sheeting, rusty and corroded substrates.

* * * * *